Feb. 18, 1941.  M. H. ELKIN  2,231,991
MAGNETO GENERATOR
Filed June 23, 1938
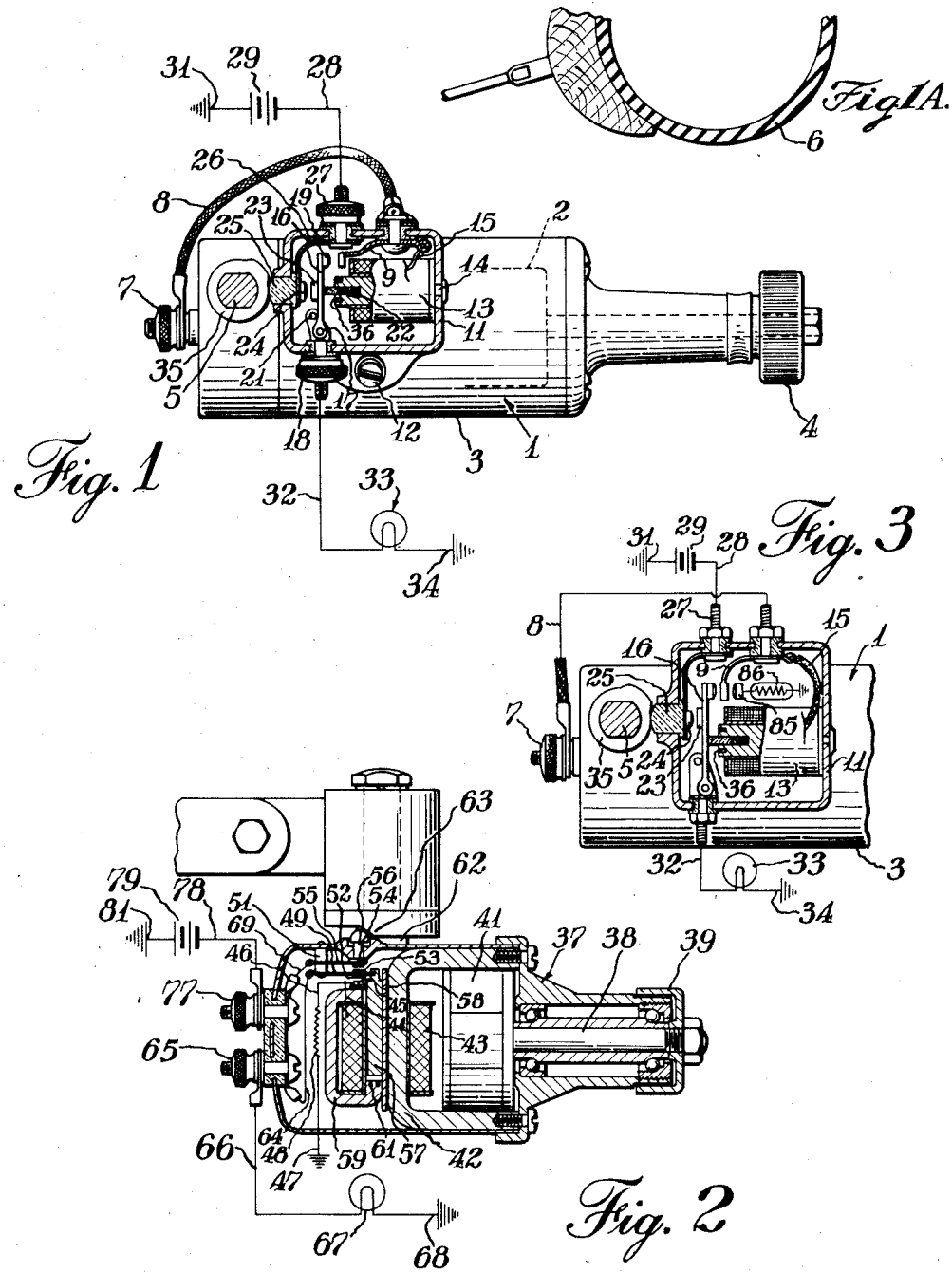

Patented Feb. 18, 1941

2,231,991

UNITED STATES PATENT OFFICE 2,231,991

MAGNETO GENERATOR

Manuel H. Elkin, Elmira Heights, N. Y., assignor, by mesne assignments, to Bendix Aviation Corporation, South Bend, Ind., a corporation of Delaware Application June 23, 1938, Serial No. 215,442

5 Claims. (Cl. 171—314)

The present invention relates to low tension magneto generators and more particularly to small variable speed generators of the type used to operate lights on velocipedes and the like.

Various types of small generators have been developed which are adapted to be driven from a moving part such as a wheel rim or tire of a velocipede to provide electrical energy for illumination. Such devices have in general been subject to the disadvantage that when the vehicle is moving slowly the light is too dim to be satisfactory, and when the vehicle stops as, for instance, at a traffic stop, the light goes out. It has been proposed to remedy this situation by the use of a battery as an auxiliary source of electrical energy, the operator being provided with a two-way switch for effecting the changeover from generator to battery and vice versa at the proper times. Manual operation, however, is uncertain and inefficient and distracts the operator's attention from the propulsion and guidance of the vehicle.

It is an object of the present invention to provide a novel electrical system for velocipedes and the like which comprises two sources of electrical energy with automatic means for utilizing said sources alternatively.

It is another object to provide such a device which includes a generator adapted to be driven from a rotating part of the vehicle and movable into and out of operative engagement therewith.

It is a further object to provide such a device which includes a switch which is closed and opened automatically by the movement of the generator.

It is another object to provide such a device comprising a magneto generator and a battery, with means for automatically switching from one to the other in accordance with running conditions.

It is another object to provide such a device in which the switching operation is dependent on the voltage of the generator.

It is another object to provide such a device in which the switching means is incorporated with the generator as a self-contained unit.

Further objects and advantages will be apparent from the following description taken in connection with the accompanying drawing in which:

Fig. 1 is a semi-diagrammatic representation partly in side elevation and partly in section of an electrical system incorporating a preferred embodiment of the present invention;

Fig. 1A is a section of a portion of a wheel rim and tire adapted to operate the magneto generator illustrated in Fig. 1;

Fig. 2 is a similar view showing a second embodiment of the invention; and

Fig. 3 is a detail showing a further development of the system illustrated in Fig. 1.

In Fig. 1 of the drawing there is illustrated a generator indicated generally by numeral 1 comprising a rotor 2 suitably journalled in a casing 3 and arranged to be rotated by means of a friction wheel 4. Generator 1 is rotatably mounted on a fixed pivot 5 whereby the friction wheel 4 is movable into and out of engagement with a rotating part such as a tire 6 (Fig. 1A) of a velocipede or the like, on the frame of which the generator is adapted to be mounted. Any suitable connections, not illustrated, may be provided for enabling the operator of the vehicle to swing the generator 1 into and out of operative position.

The output terminal 7 of the generator is connected by a lead 8 to an insulated contact member 9 mounted in the interior of a switch box 11 fixed in any suitable way as indicated at 12 on the casing 3 of the generator. A relay coil 13 is fixed in the switch casing 11 as indicated at 14 and has one terminal connected as indicated at 15 to the contact member 9, while the other terminal is grounded on the generator casing.

An armature 16 is pivoted as shown at 17 on an insulated binding post 18 and carries a contact 19 arranged to engage the contact member 9 when the coil 13 is energized, but normally maintained out of engagement therewith and against a stop member 21 by means such as a spring-pressed plunger 22. A second contact 23 is carried on the opposite side of armature 16 in position to be engaged by a contact 24 carried by a plunger 25 of insulating material slidably mounted in the side of the switch casing 11, which contact is connected by a lead 26 to an insulated binding post 27 mounted in the switch casing.

Binding post 27 is connected by a lead 28 to a battery 29 which is grounded as indicated at 31. Binding post 18 is connected by a lead 32 to a load device here shown as a lamp 33, the circuit of which is completed by a ground connection 34. It will be understood that the output binding post 7 of the generator is connected to one end of a generator coil energized by the rotor 2, the opposite end of the generator coil being grounded on the frame of the generator; but since such connections are conventional, it is deemed unnecessary to complicate the drawing by illustrating them.

Means are provided for closing the contacts 23, 24 to connect the battery 29 to the lamp 33 when the generator is swung into operative position with the friction wheel 4, engaging the tire 6 of the vehicle. As shown in Fig. 1, this is accomplished by means of a cam member 35 rigidly mounted on the fixed pivot member 5 in position to engage the plunger 25 and slide it into the switch casing 11 so as to close contacts 23, 24. When the generator is thus placed in operative position, energization of the coil 13 by rotation of the generator rotor above a predetermined minimum speed causes the armature 16 to be attracted thereby so as to open the contacts 23, 24 and close contacts 9, 19, thus disconnecting the battery 29 from the lamp 33 and connecting the generator thereto. This connection is thereafter maintained as long as the generator is operated above a minimum speed. If, as is usual, the output of the generator is an alternating current, a shading coil such as indicated at 36 may be used to maintain the engagement of contacts 9, 19.

In the operation of this embodiment of the invention, starting with the parts in their idle positions as illustrated, swinging the generator 1 so as to bring the friction wheel 4 into engagement with the tire 6 causes the cam 35 to close contacts 23, 24, thus causing the lamp 33 to be lit from the battery 29. When the vehicle is operated below a minimum speed, this connection is maintained and the battery constitutes the source of power for illumination. When, however, the vehicle is accelerated above this minimum speed, energization of the coil 13 becomes sufficient to attract the armature 16 to open contacts 23, 24 and close contacts 9, 19. Thereafter the light 33 is energized from the generator, the battery 29 being maintained idle until the vehicle slows down or stops. Release of the armature 16 thereupon restores the battery connection 23, 24 which is maintained as long as the generator 1 remains in operative position. When it is desired not to use the light, it is merely necessary to swing the generator 1 into idle position, whereupon the lamp circuit is maintained open.

In the embodiment of the invention illustrated in Fig. 2, the functions of the coil 13 of Fig. 1 are performed by means of the generator coil itself, thereby providing a smaller and more self-contained unit. As there illustrated, the generator 37 is provided with a rotor shaft 38 suitably journalled therein, carrying at one end a friction wheel 39 corresponding to the friction wheel 4, and at its other end a permanent magnet 41, the flux from which is arranged to reciprocate through an external magnetic circuit comprising a core member 42 of a generator coil 43 whereby rotation of the rotor causes alternating voltage to be generated in said coil. One end of the coil is grounded, and the opposite end is connected by a lead 44 to an insulated contact 45 and also by a lead 46 to the ground as indicated at 47 through a resistor 48 of suitable value.

A spring contact arm 49 is rigidly mounted as indicated at 51 in the frame of the generator and carries a contact 52 adapted to cooperate with the fixed contact 45. Contact arm 49 also carries a contact 53 arranged to cooperate with a contact 54 mounted on a contact arm 55 also mounted in the casing of the generator, and adapted to be moved into engagement with contact 53 by means of a plunger 56 of insulating material slidably mounted in the generator casing.

Contact arm 49 is controlled by a plunger 57 of magnetic material slidably mounted within the coil 43 and forming part of the core thereof. A spacing element 58 of nonmagnetic material is preferably interposed between the core member 42 and the plunger 57 to facilitate the sliding movement of the plunger and to magnetically insulate the plunger from said core member. Means for conducting the flux of the coil through the sliding plunger 57 is provided in the form of a member 59 of magnetic material partially encircling the coil and preferably provided with a shading coil 61 adjacent the end of the plunger 57.

The generator 37 is movable around a fixed pivot 62 in order to move the friction wheel 39 into and out of operative engagement with a rotating member of the vehicle, and means are provided for closing contacts 53, 54 upon rotation of the generator about said pivot. As here shown, the closing means is in the form of a cam member 63 fixedly mounted on the pivot 62 and arranged to engage and depress the protruding end of the plunger 56.

Contact arm 49 is connected by a lead 64 to an insulated binding post 65 which is connected by a lead 66 to a load device in the form of a lamp 67 which is grounded at 68. Contact arm 55 is connected by a lead 69 to an insulated binding post 77 which is connected by a lead 78 to a battery 79 which is grounded as indicated at 81.

In the operation of this embodiment of the invention, movement of the generator 37 by the operator about its pivot 62 in a direction to move the friction wheel 39 into operative position causes closure of contacts 53, 54 whereby the battery 79 is connected to the lamp 67 and causes it to be illuminated. Operation of the vehicle above a predetermined minimum speed causes the generator coil 43 to be energized by the reversals of flux through the core member 42 caused by rotation of the magnetic rotor 41. When this energization has attained a sufficient value, plunger 57 is moved into engagement with the member 59, thus moving contact arm 49 to open contacts 53, 54 and close contacts 45, 52. The battery is thus disconnected from the lamp and the generator coil connected thereto, whereupon the lamp is energized from the generator as long as the vehicle is in operation above a minimum speed. When the vehicle is retarded below this minimum speed or stopped, the contact arm 49 is permitted to return to its idle position as shown, whereupon the contacts 53, 54 are closed and the lamp is maintained energized from the battery 79. When the generator 37 is returned to its idle position, contacts 53, 54 are permitted to open by the cam member 63 and the lamp is thereupon deenergized.

In Fig. 3 of the drawing there is illustrated an embodiment of the invention incorporating a protective device for preventing burning out of the lamp due to rotation of the generator at unusually high speeds. The structure is generally similar to that shown in Fig. 1 and the corresponding parts are similarly numbered. The contact member 9, however, is in this case formed as a spring arm capable of being deflected by the armature 16 under the attraction of the coil 13, and a contact 85 is arranged to be engaged by the contact arm 9 after a predetermined amount of such deflection.

Contact 85 is grounded through a resistor 86 of suitable value whereby when the contact arm 9 is moved into engagement therewith, a circuit is established in shunt with the load device 33 for absorbing a suitable amount of the output energy of the generator to reduce the voltage across the load device to a safe value.

In the operation of this embodiment of the invention, when the voltage of the generator exceeds a predetermined value, the attraction of the coil 13 causes the armature 16 to deflect the contact member 9 sufficiently to close the shunt circuit through resistor 86. The voltage across the load device 33 is thus reduced to a safe value, and the protective circuit is maintained as long as the generator is rotating at excessive speed.

It will be understood that the movement of the contact member 9 might be caused to introduce a resistance into the load circuit rather than complete a shunt circuit with respect thereto if so desired, but the present arrangement is preferred by reason of its simplicity.

The use of a device of this character permits the utilization of a load device such as a lamp of comparatively low voltage so as to provide effective illumination at low speeds of the vehicle without the danger of burning out at high speeds.

Although certain embodiments of the invention have been shown and described in detail, it will be understood that other embodiments are possible and various changes may be made in the design and arrangement of the parts without departing from the spirit of the invention as defined in the claims appended hereto.

What is claimed is:

1. In an electrical system for velocipedes and the like, a generator including a casing, and a magnetic rotor journalled therein, driving means for said rotor, means supporting the casing for movement to bring the driving means into and out of operative engagement with a rotative element of the velocipede, an electrical load device, a battery, a control switch, a circuit including the battery, the electrical load device and control switch, means whereby movement of the driving means into operative engagement closes the control switch to complete said circuit, and means responsive to generator voltage and associated with the control switch for disconnecting the battery and connecting the generator in said circuit.

2. In an electrical system for bicycles and the like, a battery, a magneto generator, a load device, manually operable means for moving the generator to bring the rotor into operative engagement with a rotating part of the velocipede, switch means operable by such movement of the generator to connect the battery to the load, and means including an electromagnet actuated by current from the generator at a predetermined rotative speed thereof for actuating said switch means for thereby disconnecting the load from the battery and connecting it to the generator, said switch means being operative to restore the original connections upon reduction of the speed of the generator below a predetermined minimum.

3. In an electrical system for velocipedes and the like, a load device, a battery, a magneto generator including a rotor, manually operable means for moving the generator to bring the rotor into operative engagement with a rotating part of the velocipede, switch means operable by such movement of the generator to connect the battery to the load device, and electromagnetic means operable by the generator at a predetermined speed for disconnecting the load from the battery and connecting it to the generator.

4. In an electrical system for velocipedes and the like, a battery, a load device, a generator including a rotor, manually operable means for moving the generator to bring the rotor into operative engagement with a rotating part of the velocipede, switch means operable by such movement of the generator to connect the battery to the load device, said generator also including an output coil with a magnetically permeable core, a portion of said core being movable, and means forming an external magnetic circuit for the movable portion of the core with a gap closed by the movement of said member, said switch means including means operable by said movable portion for controlling the connection of the generator to the load device.

5. In an electrical system for velocipedes, a generator, a battery, a load device, means for actuating the generator from a rotating member of the velocipede, means under the control of the operator for moving the generator into and out of operative position, switch means connecting the load device to the battery when the generator is moved into operative position, means including an electromagnet responsive to voltage of the generator above a predetermined minimum for actuating said switch means to disconnect the load device from the battery and connect it to the generator, a resistor, and means whereby actuation of said switch means by the electromagnet responsive to voltage of the generator above a predetermined maximum causes the resistor to be connected in shunt with the load device.

MANUEL H. ELKIN.